Nov. 11, 1958    T. N. CUMMINGS ET AL    2,859,714
METHOD OF MAKING A FROZEN CONFECTION ON A STICK
Filed March 23, 1953
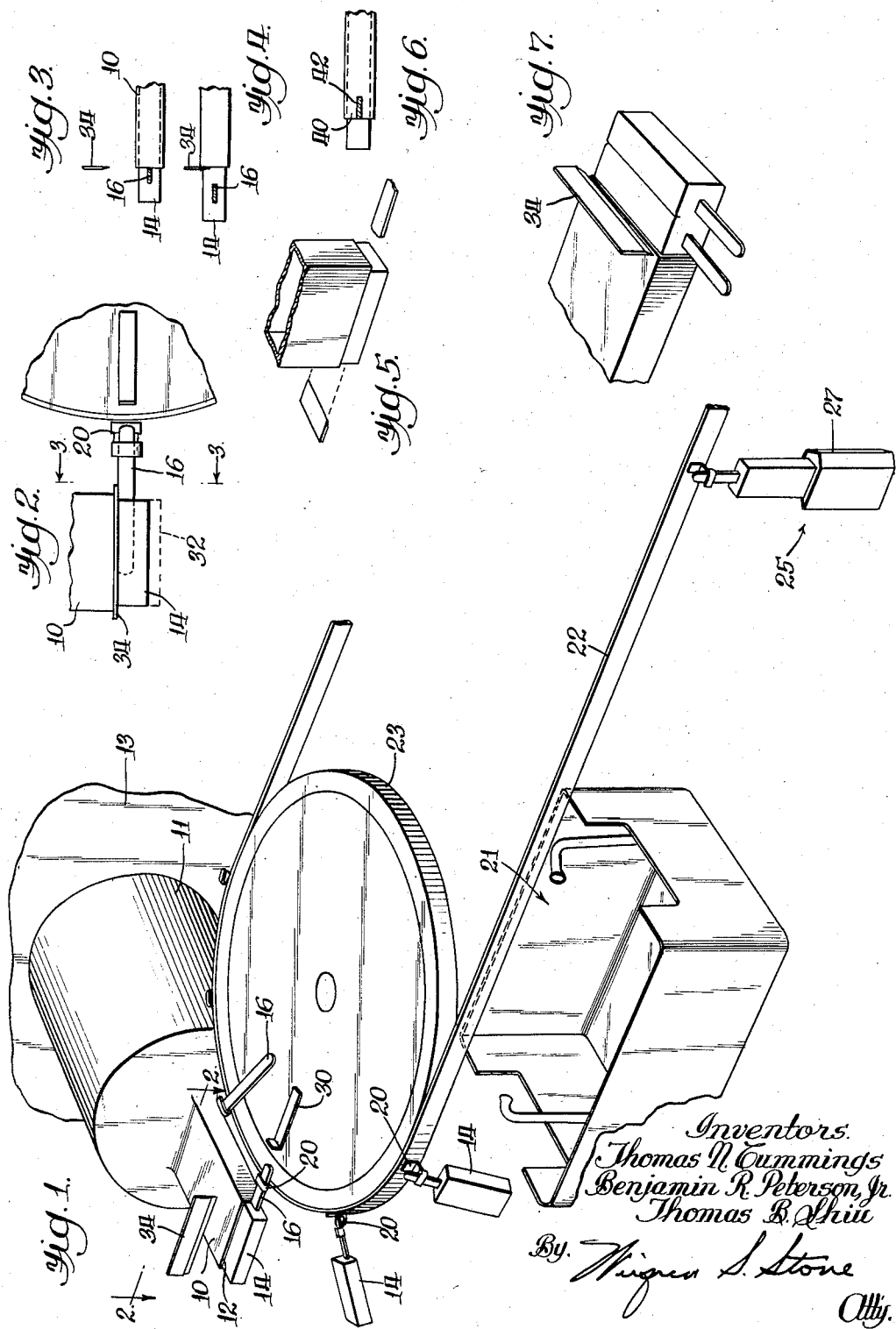
Inventors:
Thomas N. Cummings
Benjamin R. Peterson, Jr.
Thomas B. Shiu
By
Atty.

United States Patent Office 2,859,714
Patented Nov. 11, 1958

2,859,714

METHOD OF MAKING A FROZEN CONFECTION ON A STICK

Thomas N. Cummings, Chicago, Benjamin R. Peterson, Jr., Wheaton, and Thomas B. Shiu, Chicago, Ill., assignors of one-fourth to Nicholas A. Cummings, Chicago, Ill.

Application March 23, 1953, Serial No. 344,051

7 Claims. (Cl. 107—54)

This invention relates to a method of making small frozen confections, particularly to ice cream bars, on a stick. Usually, these confections are coated with chocolate.

The handling of a frozen edible product after it leaves the original mixing chamber is difficult because the work is performed in rooms having a temperature well above the freezing point. Any piece of equipment that the ice cream touches is at a temperature above that of the ice cream. Surface softening occurs and ice cream wipes off on whatever it contacts. Where the only additional step is packaging, the problem is not difficult because the ice cream is either cut into bricks and deposited in a final wrapper or extruded into containers. The ice cream does not touch conveyor belts or tables and consequently a high degree of sanitation can be maintained.

In the case of the ordinary stick ice cream or frozen sherbet bar wherein each bar must be enrobed in chocolate either by dipping or spraying, the bar must be held. In order to attain efficient quantity production, they must be held in large numbers. The problem has been solved by employing multi-cavity molds of the size of the finished bar. Into these molds is poured an ice cream at a temperature of about 21°–25° Fahrenheit. A stick is inserted into each mold either before or after the ice cream is poured. Thereafter, the free end of the stick is held for performing further operations on the bar. Thus, a tray with 24 or 48 small mold cavities will be filled with ice cream. Then a frame having stick holders each positioned to register with one of the mold cavities is loaded with sticks and the stick holder frame is registered with the top of the cavity tray, thereby forcing a stick centrally into the ice cream in each mold. The tray and stick holder have interlocking means to maintain registration of the sticks in the molds. The tray is passed through a hardening zone to bring it down to 5° below to 5° above zero Fahrenheit. Thereafter, it is slightly defrosted. The stick holder frame is released from the tray and in raising therefrom, the ice cream bars adhere to the sticks. The ice cream bars are next dipped in chocolate. When this has hardened, the stick holder frame is placed over a bag-holding device so that each bar registers with a bag. Then the stick holders are released. This is a popular way of making chocolate coated ice cream bars on a stick. It requires much manual labor, the equipment is costly, and the cavities must be sterilized after each use.

Complicated machines have been proposed and some are in use wherein the bars are successively molded in small cavities, either with or without a stick therein at the time of pouring, and thereafter the stick with the bar adhering thereto is picked up by a conveyor, dipped in chocolate, and dropped into a bag.

The ice cream bars produced by these methods and equipment do not contain top quality ice cream, irrespective of the quality of the mix. Top quality ice cream is dependent not only upon the quality of the mix, but also upon the freezing. A top quality mix can be converted into an inferior ice cream by the freezing process. Thus, if a top quality mix is extruded from the freezer at 25° and deposited in a container, the final texture of the ice cream will depend upon the rate of freezing. If the ice cream is placed in a hardening room which requires 24 to 48 hours to bring it down to 10° below zero, the ice cream will contain ice crystals. This ice was not in the mix as it left the ice cream freezer. It was formed by a separation of the ingredients of the ice cream in the freezing room followed by hard freezing.

In making commercial ice cream, the ingredients are mixed in a large vat at a comparatively high temperature. The mix is a thick flowable mass. This mix is withdrawn through a pipe from the vat and introduced into a fast freezer where the mix is continuously agitated and its temperature is brought down to about 32° or 38° Fahrenheit. From the fast freezer, the ice cream is extruded from a pipe into whatever package-filling equipment is being used. The ice cream comes out in a flowable condition and its texture is very smooth. This is due to the fact that the blades in the fast freezer very successfully maintained the degree of mixing obtained in the mixing vat while nevertheless bringing down the temperature. The ability of the freezer to lower the temperature is not dependent upon its heat-extraction qualities for these fast freezers can pull the temperature well below zero. However, the ability of the blades to continue to function and force ice cream out of the fast freezer is very dependent upon the temperature of the ice cream, for as it cools, it stiffens. Applicants find that as they lower the temperature below 22° F., the tendency of the fast freezer to freeze up becomes great.

The first general object of this invention is to extrude ice cream directly from a fast freezer onto a stick at a temperature sufficiently low so that the bar will adhere to the stick. Inasmuch as the ice cream is coming directly from the fast freezer, it will have a high quality texture. In the methods of making ice cream bars heretofore described, the quality is impaired first by the step of filling the molds with a comparatively high temperature ice cream, then partially hardening it so that sticks will hold the bars, then partly defrosting it in order to release the bars from the molds.

The second general object of this invention is to hold the free end of the sticks during the extruding and mounting process so that all further steps in the manufacture of ice cream bars may be performed without letting the ice cream rest upon any kind of structure.

The first specific object of this invention is to provide a booster on the output of the fast freezer which will maintain the desired low temperature while at the same time providing sufficient force to expel the ice cream through an extruding nozzle. Expressed differently, the first object of the invention is to prevent the fast freezer from freezing up at temperatures as low as 10° Fahrenheit.

The second specific object of this invention is to insert the sticks in a column of continuously extruded ice cream so that the sticks are firmly mounted in the ice cream without interfering with the flow. In applicants' process, the ice cream is extruded continuously from an orifice and in order to maintain the quality of the ice cream, the flow must be steady. Any attempt to block the orifice, even momentarily, will compact a portion of the ice cream and alter its consistency. In attaining this object, applicants employ three important steps: Firstly, the sticks are introduced into the ice cream in such a way that they will not interfere with the flow. Thus, the stick is introduced with its flat surface parallel to the direction of flow. In one embodiment, the stick is inserted sidewise into the flow but the insertion is so rapid that no substantial movement of the ice cream occurs during the fraction of a second in which the stick is inserted. In a second embodiment, the stick is inserted endwise in counter-direction to the flow. Secondly, in the embodiment in which the stick is introduced sidewise, which is the preferred embodiment, applicants move the sticks through a stick-loading station along a line which at least momentarily is substantially parallel to the direction of ice cream flow and at the same speed. Thirdly, the stick is inserted into the ice cream either while it is projecting into air or just before it is completely projected into air.

Another specific object of the invention is to perform the stick-inserting step at a point where there is the least likelihood of altering the relationship of the portion of ice cream which has received the stick with respect to the main column of the extruded ice cream. Applicants insert the stick either immediately adjacent the orifice or inside the orifice. Ideally, applicants prefer to extrude the ice cream through an orifice, the perimeter of which is lying in a single plane. The reason for this is sanitation. If the orifice is horizontally directed, the weight of the extruded ice cream tends to break it off. This coupled with the force of the stick in entering the ice cream has a tendency to slightly deform the extruded portion. On the other hand, if the orifice is slotted slightly to receive a stick, the disadvantage of breaking off is reduced but it is hard to keep the orifice at as low a temperature as the ice cream and there will be a tendency of the ice cream to melt around the slot and cause dripping.

Another object of this invention is to provide the coating stage immediately after the stick-inserting and severing steps. Most coating, particularly the chocolate coating, has a melting point in the neighborhood of 70° to 80° Fahrenheit. If the coating is poured over ice cream which is at a temperature of 10° to 20° Fahrenheit, the coating hardens within a matter of seconds. By performing the coating step immediately after the ice cream has left the extruding orifice, applicants are able to take advantage of the favorable temperature of the ice cream to harden the coating. The net result is that the whole process of creating coated stick confections is greatly shortened from the standpoint of time. From the time the ice cream is extruded from the orifice to the time it is dropped into a bag or otherwise packaged in applicants' process is a matter of approximately 30 seconds. When the bar is finally wrapped, its temperature is only a few degrees above the extruding temperature. At temperature below 20°, the bars are comparatively easily handled. They can be boxed and moved into the final hardening room with ease.

These and such other objects as may hereafter appear are attained by the methods disclosed in connection with the accompanying drawings wherein:

Fig. 1 is a perspective view of schematic apparatus performing applicants' preferred method;

Fig. 2 is a schematic plan view illustrating the time when the stick is inserted into the extruding ice cream and taken on the line 2—2 of Fig. 1;

Fig. 3 is a side elevation taken on the line 3—3 of Fig. 2;

Fig. 4 is similar to Fig. 3, but shows the bar at the commencement of the severing step;

Fig. 5 shows in schematic perspective a downwardly directed orifice having the cross section of the large side surface of the finished bar and illustrating how downward extrusion could be substituted for lateral extrusion and associated with the apparatus shown in Fig. 1 by turning it on its side;

Fig. 6 is a side elevation of the end of an extruding tube but with an open-ended side slot through which a stick may be inserted; and, Fig. 7 is a perspective view of an extruder for sherbet bars which are sold in attached pairs.

Briefly, applicants extrude ice cream through an orifice having the dimensions of one cross section of the final bar, and at a temperature such that the ice cream holds its shape as it enters the air. A stick held in a holder mounted on a chain is forced into the extruded portion of the ice cream and then the ice cream is cut off at the lip of the orifice to form the final bar. Thereafter the free end of the stick is manipulated by the holder on the chain to perform further operations on the bar, i. e., dipping in chocolate, and dropping into a bag.

Referring to the drawings, in Fig. 1, ice cream is being forced in a continuous stream through the extruding tube 10 to an orifice 12. This orifice 12 has cross-sectional dimensions identical to those of the long, narrow cross section of the final ice cream bar. As the ice cream 14 moves from the orifice 12, it is shape-holding and remains attached to the main body within the tube 10. Immediately after the longitudinal midpoint of the final ice cream bar passes the orifice 12, a stick 16 is thrust quickly into the side 18, see also Fig. 2. When the extruded portion equals the full width of the bar, see the dotted line 32 in Fig. 2 or 4, the knife 34 slices it off, leaving the bar held by the stick. The stick 16 is held in a holder 20 which is mounted on one link of a chain 22 (schematically illustrated as a belt) which is moving around a sprocket 23 at the same speed as the ice cream down the tube 10. The chain 22 carries the stick 20 and bar 14 first to a chocolate enrobing station 21. The chocolate hardens in a few seconds. The bar is carried on to a bag-filling station 25 (or other type of packaging station) where the holder 20 releases the stick and the bar drops into a bag 27. The mechanism for moving the chain or manipulating the stick holders is not shown.

From the time the bar leaves the orifice 12 to the time it is dropped into a bag, it engages no hard surface. Nothing is engaged by it to acquire softened ice cream and consequently there is nothing to clean. If the operation is performed sufficiently fast and in an atmosphere of as high as 70° Fahrenheit, there is no dripping from the bar before it reaches the enrobing stage, and immediately after the enrobing stage, the chocolate, having a high melting point, sets. Additionally, the chocolate solidifies around the stick at the point where the stick enters the bar and provides additional purchase. The entire operation is performed within a minute.

The conditions to the success of the method are the susceptibility of the ice cream to receive the stick and the ability of the ice cream to hold its shape. These two conditions are influenced by several factors. Most importantly is the character of the ice cream mix. The higher the water content, the more rigid the mix at any selected temperature below freezing. Assuming that one was extruding straight ice from the orifice 12, and assuming that it could be chopped off, there would be no possibility of inserting a stick or even a piece of steel without shattering it. Extruding an ordinary ice cream at 20° or 30° below zero would produce approximately the same result. There is a range between frangibility and high shape-holding qualities at one extreme and low frangibility and low shape-holding qualities at the other extreme between which applicants' method will succeed. For the ordinary commercial ice creams having from eight to fifteen percent butter fat content, extruding today is done in a range of 20° to 25° Fahrenheit. Usually, the extruding is done downwardly into cups or other receptacles in which the ice cream will remain until ultimately consumed. The ice cream does not flow freely but it does flow. Applicants' ice cream at the extruding orifice is at approximately 5° to 19° Fahrenheit. As the temperature is increased, the shape-holding quality declines while the ease of inserting the stick increases. As the temperature is further lowered, the shape-holding qualities are improved, but frangibility increases and it is increasingly difficult to insert the stick, and once inserted, increasingly easy to withdraw. As the butter fats in the ice cream are increased, the temperature at which applicants' method can be used rises. Other solids may be added to the ice cream which obtain this same result. The stick actually displaces the ice cream and to a limited extent compacts the ice cream adjacent the surface of the stick. Where this force is less than the force necessary to break the bar off of the continuous flow, applicants' method succeeds. Applicants have found that ordinary commercial ice creams extruded between 10° and 20° Fahrenheit will hold their shape when extended sidewise from the extruding orifice while the stick is inserted. In this temperature range, the purchase of the ice cream on the stick will be sufficient to permit the stick to be held downwardly by its free end without the ice cream bar dropping off of it.

The cylindrical member 11 and the facing plate 13 schematically represent a pressure booster and the front of a fast freezer respectively. The fast freezers in commercial use are intended to be operated at a temperature above 20° Fahrenheit. When operated below this temperature, the mix at first slows up the blades and then stops them. This terminates extrusion. It is, therefore, necessary to introduce between the output of the fast freezer and the extrusion orifice a pressure booster. This pressure booster may assume one of several forms and may be merely a power driven screw which helps pour the ice cream out of the fast freezer, thereby relieving the load upon their vanes. Fast freezers may be designed with sufficient power to reduce the ice cream to a temperature of 10° Fahrenheit and at the same time force out the ice cream without freezing up. The essential characteristic of the fast freezer and the booster is that they deliver the ice cream to the extrusion orifice with that high texture quality or smoothness which characterizes high grade ice cream.

Inserting the sticks with the flat surface parallel to the line of flow is important because if the lateral movement of the sticks is not quite the same as the rate of flow of the ice cream, the edge of the stick presents so small an area to the flowing ice cream as to not materially affect it. It is desirable that the stick be introduced as close to the orifice as possible so that the orifice will assist in supporting the extruded portion of the ice cream and minimize the effect of the stick insertion. In this connection, referring to Fig. 6, the orifice 40 has been slotted at 42 so that the stick is actually moved into a portion of the ice cream against which there is a back wall. This slot is a little more likely to accumulate melting ice cream which will drip and hence less desirable. However, in certain mixes of ice cream or frozen sherbet, it may be necessary to take advantage of this construction. The tube 10, referring to Fig. 1, could be curved around the sprocket 23 and the slot greatly lengthened so that the sticks could be slowly inserted in the ice cream through the slot. Alternately, this could be accomplished by moving the sticks as they approach the stick-loading station along a straight flight of chain parallel to the tube 10.

The factors governing the hardness of the ice cream are present whether the ice cream is extruded horizontally, vertically downwardly, or vertically upwardly. Extruding the ice cream upwardly does result in a collection of hardened ice cream around all edges of the orifice. This ultimately melts and creates a cleaning problem. Extruding the ice cream downwardly, see Fig. 5, completely eliminates the cleaning problem but the knife arrangement is a little more difficult to mount for mechanical reasons. In the downward extrusion, applicants may use an orifice having the dimensions of the large side face 36 in Fig. 1 and not the smaller side face actually shown. However, this necessitates the insertion of the sticks with the flat surface transverse to the line of flow and if the sticks are not moving at exactly the same rate as the flow of the confection, the bar may be distorted and a firm grip may not be obtained.

Downward extrusion offers possibilities when the extruder and stick mounting arrangement suggested in Fig. 5 is mounted vertically. In this arrangement, the sticks are presented vertically successively beneath the extruding orifice. They are mounted on a chain conveyor which is moved step by step. The distance that each stick is moved horizontally in each stage is but a fraction of the length of the ice cream bar so that while the movement of the stick after insertion into the ice cream is transverse to the line of flow, the stick may be moved only a short distance to get the bar out of line with the stick oriffice.

The method illustrated is based on a continuous flow of the ice cream and a movement of the sticks at the same rate of flow. The bars are being extruded at the rate of about 250 a minute and as the stick is thrust in, it is moving laterally with the direction of flow. As illustrated in the sketch, the stick is moving in a line which does not remain at exactly right angles to the ice cream but it is thrust into the ice cream so quickly that no appreciable effect is felt by this slight movement of the stick in a line which is not exactly at right angles with the movement of the ice cream. Also, the stick holders 20 do not hold the stick in a true line, nor does the stick pusher 30.

Most ice cream bars are sold as single units with one stick in them. In the case of the frozen sherbets, a competitive consumer price frequently is less than a nickel, whereas the industry prefers to package a commodity for not less than a five-cent price. It is common to sell the sherbet bars as twins or attached bars. There is a thin land of frozen confection between the bars. This holds them together and there is a stick in each bar. The child can break the bars apart. Applicants' apparatus can turn out such bars by the simple expedient of operating the cutter 34 after two sticks have been inserted instead of one. A partial stroke of the cutter will serve to create the thin land. Fig. 7 illustrates the manufacture of such bars.

It should be mentioned that the majority of so-called stick ice cream bars are not sold with the name ice cream upon them. Most States have established a minimum butter fat content on any frozen confection which is sold as ice cream. The most popular bars on the market today contain only 3% or 4% of butter fat which is substantially less than minimum established by law which permits the use of the word ice cream. These mixes have a consistency similar to that of a high butter fat content mix and they act during freezing steps similarly. The important thing is that the mix be smooth as it leaves the vat and continues to be smooth down to the extruding temperature. The taste quality of these frozen confections is more dependent upon the smoothness than it is upon the butter fat content.

A sherbet mix functions in substantially the same way as the ice cream mix. The sherbet bars usually are not coated, and when making these bars, the enrobing stage 21 is not in use.

A great advantage in applicants' method of making coated confections resides in the positioning of the enrobing stage 21 close to the extrusion orifice. The common coating for ice cream bars is chocolate. These chocolates have a comparatively high melting point, i. e., above 60° Fahrenheit. The temperature at which applicants are extruding their confection is ideal for the confection as it enters the enrobing stage. The surface of the confection removes the heat from the chocolate almost instantly and as the chocolate bar leaves the enrobing stage, a matter of 10 or 15 seconds, its surface is dry and cold. Applicants have suggested dropping each bar into a bag at a wrapping station 23. Applicants actually encase each bar in a heat-sealed plastic. The time consumed from the cutting off of the bar at the stick-loading station to releasing the bar enclosed in a package at the packaging station 23 does not exceed 20 seconds. The entire operation can be performed in the 50° to 70° temperature at which ice cream blades are maintained. The entire operation is highly sanitary.

Having thus described their invention, applicants claim:

1. The method of making a stick-supported frozen confection, comprising continuously extruding a self-sustaining length of frozen confection of uniform cross-section; moving a stick into position adjacent to said confection with the longitudinal axis of said stick disposed at a right angle to the axis of extrusion of said confection; moving said stick transversely to its length, when adjacent to said confection, in the same general direction as said confection at substantially the same speed; inserting said stick in the direction of its length into said confection while said stick and said confection are moving in the same general direction at substantially the same speed; and severing a portion of said extruded confection containing said stick.

2. The method of claim 1 in which said frozen confection is ice cream at a temperature below 20° F.

3. The method of claim 1 in which said stick is a flat stick having its flat surface parallel to the direction of flow of said frozen confection at the time of insertion.

4. The method of making a stick-supported frozen confection, comprising continuously extruding a self-sustaining length of frozen confection of uniform cross-section; moving a plurality of sticks in equally spaced relation so that each individual stick reaches a position adjacent to said confection with the longitudinal axis of said stick disposed at a right angle to the axis of extrusion of said confection; moving each stick transversely to its length when adjacent to said confection, in the same general direction as said confection at substantially the same speed; inserting each stick in the direction of its length into said confection while said stick and said confection are moving in the same general direction at substantially the same speed; and severing said extruded confection at regular intervals to provide equal-sized sections thereof containing at least one of said sticks.

5. The method of claim 4 in which said frozen confection is ice cream at a temperature below 20° F.

6. The method of claim 4 in which each stick is inserted in said frozen confection immediately after its extrusion in said uniform cross-section.

7. The method of claim 4 in which the cross-section of said length of frozen confection is generally rectangular and said sticks are flat sticks which have their flat surface parallel to the direction of flow of said frozen confection at the time of insertion.

References Cited in the file of this patent

UNITED STATES PATENTS

| | | |
|---|---|---|
| 2,094,769 | Anderson | Oct. 5, 1937 |
| 2,101,570 | Bolen | Dec. 7, 1937 |
| 2,152,214 | Sattler | Mar. 28, 1939 |
| 2,278,923 | Grau | Apr. 7, 1942 |
| 2,571,136 | Horton | Oct. 16, 1951 |
| 2,629,346 | Johansen | Feb. 24, 1953 |